Patented Apr. 13, 1943

2,316,228

UNITED STATES PATENT OFFICE 2,316,228

PROCESS FOR THE PRODUCTION OF CHROMITE BLOCKS

Konrad Erdmann, Radenthein, Austria; vested in the Alien Property Custodian

No Drawing. Application December 28, 1936, Serial No. 118,018. In Austria December 31, 1932

11 Claims. (Cl. 106—59)

My invention relates to chrome refractory brick, more particularly to refractories composed of chromite and a highly magnesian refractory vehicle and to methods of making the same. This application is a continuation in part of my application Serial No. 683,559, filed on Aug. 3, 1933, for Refractory brick.

Whenever I use the term "chromite" hereinafter I mean chrome iron ore (chrome ore), a mineral of the spinel group containing as the main constituent, besides some gangue, a double oxide of iron and chromium, the chemical formula of which is $FeO.Cr_2O_3$, part of the chromium oxide being always replaced by ferric oxide and alumina, and the iron oxide being always partially replaced by magnesium oxide. Though in the scientific sense the term "chromite" means the pure compound $FeO.Cr_2O_3$, in technical language the terms "chromite" and "chrome iron ore" are used as synonyms to denote the native mineral of the spinel group as specified above.

The main object of my invention is to provide bricks having unprecedented resistance to sudden changes of temperature, great slag resistance and strength at high temperatures, and fair strength at atmospheric temperatures.

Bricks made exclusively of chromite, although otherwise admirably suited for employment as refractory material, share with those of magnesite, the unwelcome property of poor spalling-resistance. The present invention succeeds in surprisingly improving chromite bricks, as regards resistance to spalling, by the combined measures in the production of the brick of blending the chromite with a particular addition of a magnesian refractory and by the use of a particular selection of grain sizes both as herein disclosed. This valuable result is achieved according to my invention while securing bricks which show simultaneously great slag resistance and strength at high temperatures and fair strength at atmospheric temperature.

Selection of grain sizes is a measure generally known in the ceramic industry, and one of special application in connection with the production of chromite bricks also, this having heretofore been done, in this particular art, for the purpose of increasing as far as possible the density of the bricks. Proposals of this kind are devoid of importance for the production of bricks capable of withstanding sudden changes of temperature; it has transpired that there is no necessary relation between density and spalling-resistance.

This resistance to spalling can be tested by heating the brick in an electric furnace to 950° C. for a period of 50 minutes, and therafter chilling by a blast of cold compressed air at one atm. for five minutes. The numerical values (as hereinafter given in connection with the tests of spalling resistance) indicate the number of repetitions of heating and chilling cycles endured by the brick without any part of the heated portion splitting away. Tested by this method the best bricks heretofore produced from chromite alone give a spalling value of only 1 to 4, whereas the bricks of chromite mixture produced in accordance with the present invention give a value of 30 to 40 and in some instances much more.

According to the invention, in order to obtain the result aimed at, in a mixture of chromite and highly magnesian refractory material, containing chromite in larger quantity than the magnesian refractory material, the proportion of grains below $100\mu$ (passing through a 150 mesh per linear inch screen) and above $1000\mu$ (retained on a 16 mesh per linear inch screen) must be increased relatively to the intermediate fraction.

The foregoing and all the following data regarding sieve designations refer to the Tyler Standard Screen Scale (cf. International Critical Tables 1927, Vol. II, 330).

As a rule, in the ground material, chromite as well as magnesite, as it comes from any kind of usual grinding devices, the fraction below $100\mu$ amounts to about 12 to 25%, that between $100\mu$ and $1000\mu$ to about 40 to 80% and that above $1000\mu$ to about 10 to 30%. According to my invention the mix is prepared in such a manner that the proportion of the fine fraction amounts at least to 20 to 40%, that of the middle fraction does not exceed 15 to 25% and that of the coarse fraction amounts at least to 35 to 65%.

In an alternative embodiment of the invention, giving better results, the grains of intermediate marginal sizes between the fine and middle fractions, and/or between the middle and coarse fractions respectively, are screened off and removed so that there is a difference of at least $100\mu$ between the size of the smallest grain in the next coarser fraction and the size of the largest grain in the next finer fraction; when still better bricks are desired this difference in size may even be as much as from 400 up to 1000μ, corresponding to the difference between a 35 and 16 mesh per linear inch screen. If the upper of these limits, that is to say 1000μ be reached, what happens is that the entire middle fraction is omitted. In this case the relative proportions of the fine to the coarse grain sizes will then be as (20 to 40) : (80 to 60)

The proportion of magnesian refractory in the mixture may be at least 20% and may be as high as 50% of the whole charge. A preferred mixture is one containing 20 to 40%, for example about 30%, of this material. It is of decisive importance that a preponderant part of the magnesian constituent, preferably the whole of the same, be in a fine condition below about 100μ. On the other hand, it is preferable to introduce the chromite chiefly as coarse fraction into the charge. In order to obtain the highest spalling values, at all events no particles of chromite below 100μ ought to be present in the mix. The bricks are bonded with sulphite waste liquor or with molasses or dextrine, or with other organic binders, although any suitable inorganic binder, for instance water glass, may also be used. I find that about 4 to 5% of sulphite waste liquor of 20° Bé. or 8% of a 50% solution of dextrine will serve as an effective binder, the amount of sodium silicate of 60° Bé. being preferably less than 6% or even 4%.

My invention is not intended to yield bricks of increased density. The porosity of the bricks made according to the invention lies practically between 21 and 27% while that of normal bricks on the market is between 19 and 29%. The figures given represent the apparent porosity in respect of a body, which term means the ratio of open pore space to volume expressed in percentages of the volume. The apparent porosity is calculated from water absorption (W) and bulk density (r) in accordance with the formula $P_s = r.W$.

Example I

Ground chromite material containing grains of all sizes between 0 and 3000μ (passing through a 7 mesh per linear inch screen) is graded into three fractions of the sizes (a) the fine fraction, 0 to 100μ (passing through a 150 mesh per linear inch screen), (b) the intermediate fraction, 100 to 1000μ (between a 150 and 16 mesh per linear inch screen) and (c) the coarse fraction, 1000 and 3000μ (between a 16 and 7 mesh per linear inch screen), whereafter the grain sizes 0 to 100μ are eliminated. 20 parts of the intermediate fraction 100 to 1000μ and 50 parts of the coarse fraction 1000 to 3000μ are taken and intimately mixed with 30 parts of very finely divided dead burned magnesite the coarsest particles of which are below 100μ (passing through a 150 mesh per linear inch screen). In order to obtain the desired fineness of the magnesian refractory a special subdivision is brought about by passing the material through a fine grinding device, for instance a tube mill.

The material to be pressed is thus made up of the three fractions specified above in such a way that the ratio between the fine, intermediate and coarse fractions is 30:20:50. These figures represent mean values and can be varied in either direction to the extent of about a third, that is to say the fine magnesia fraction (0 to 100μ) can vary between about 20 and 40%, the intermediate fraction (100 to 1000μ) can vary between about 15 and 25%, while the coarse chromite fraction (1000 to 3000μ) can be between 35 and 65%. After having made up the charge by intimately blending the three fractions, the mix is moistened with water and also, if desired, incorporated with 4 to 5% of sulphite waste liquor of about 20° Bé., and molded under pressure of 200 to 1000 kgs. per sq. cm. Finally, the molded bricks are dried, and then baked at temperatures between 1400 and 1600° C.

The spalling test of the thus obtained brick is as high as 70.

Example II

From ground chromite material containing all grain sizes from 0 to 3000μ, the fractions 0 to 500μ (passing through a 32 mesh per linear inch screen) and 1000 to 1500μ (between a 16 and 10 mesh per linear inch screen) are eliminated. There remains an intermediate fraction between 500 and 1000μ and a coarse fraction between 1500 and 3000μ. 15 parts of the intermediate chromite fraction and 50 parts of the coarse chromite fraction are then intimately mixed with 35 parts of the magnesian fine meal as specified in Example I. The mix is further treated in the manner described in the said example.

The spalling test of the thus obtained brick is as high as 70.

Example III 70 parts of a coarse chromite grain of a size between 2000 and 3000μ (between a 9 and 7 mesh per linear inch screen) is intimately mixed with 10 parts of dead burned magnesite of a size between 500 and 1000μ (between 32 and 16 mesh per linear inch screen) and with 20 parts of an extremely fine magnesia meal prepared in the manner specified in Example I.

The spalling test of the brick made in this manner is as high as 70.

Example IV 65 parts of coarse chromite grain having sizes between 1000 and 1900μ (between a 16 and 9 mesh per linear inch screen) are intimately mixed with 35 parts of magnesia meal prepared as specified in Example I. This mass is worked up following the indications given in Example I.

The bricks produced gave an average spalling test of more than 70.

Bricks made as described above may also be handled in an unbaked condition, that is to say may be only dried and without previous firing, placed in a furnace lining. Thus I use the term "baking" in the following claims to include both kiln firing, and heating to firing temperature in a furnace lining during use without previous kiln firing.

All percentages mentioned herein are percentages by weight unless the context clearly indicates that they are percentages by volume, as in the case of porosity. Referring to a certain percentage of water soluble bond, I include the water which is used as a vehicle for the bond.

Whenever I mention chromite I mean chrome ore of the type used in making refractory brick, that is to say a hard sort of chrome iron ore with a $Cr_2O_3$ content of about 38 to 50%. Chromites of this kind are to be taken in the raw, that is to say unburned condition.

The term "magnesia" is used to include not only calcined magnesite but also molten magnesia.

The dead-burned magnesite used may contain between 0.5 and 2.5% CaO. A typical analysis of a suitable dead-burned magnesite is

| | Per cent |
|---|---|
| MgO | 90.90 |
| CaO | 1.00 |
| Fe$_2$O$_3$ | 3.80 |
| Al$_2$O$_3$ | 1.10 |
| SiO$_2$ | 3.10 |
| Loss on ignition | 0.10 |
| | 100.00 |

What I claim is:

1. In the process of making chromite-magnesia brick having unprecedented spalling resistance, great slag resistance and strength at high temperatures, and fair strength at atmospheric temperatures, the improvement which comprises adjusting the proportion of the sizes of particles in a material consisting essentially of ground chromite and ground magnesia in which the amount of said chromite is between 60 and 80%, in such a manner that the mixture will contain at least about 20 to 40 parts of a fine fraction composed of particles of a size below 100$\mu$ (passing through a 150 mesh per linear inch screen), not over 15 to 25 parts of an intermediate fraction composed of particles of a size between about 100$\mu$ and about 1000$\mu$ (between a 150 and 16 mesh per linear inch screen) and at least about 35 to 65 parts of a coarse material composed of particles of a size above about 1000$\mu$ (retained on a 16 mesh per linear inch screen), substantially all of the magnesia being in a fine condition below about 100$\mu$ (passing through a 150 mesh per linear inch screen), whereas the said fine fraction below about 100$\mu$ contains substantially no chromite; molding the mixture into bricks and baking the bricks.

2. In the process of making chromite-magnesia brick having unprecedented spalling resistance, great slag resistance and strength at high temperatures, and fair strength at atmospheric temperatures, the improvement which comprises adjusting the proportion of the sizes of particles in a material consisting essentially of ground chromite and ground magnesia in which the amount of said chromite is greater than 60%, in such a manner that the mixture will contain at least about 20 to 40 parts of a fine fraction composed of particles of a size below 100$\mu$ (passing through a 150 mesh per linear inch screen), not over 15 to 25 parts of an intermediate fraction composed of particles of a size between about 100$\mu$ and about 1000$\mu$ (between a 150 and 16 mesh per linear inch screen) and at least about 35 to 65 parts of a coarse material composed of particles of a size above about 1000$\mu$ (retained on a 16 mesh per linear inch screen), the whole of the magnesia being in a fine condition substantially below 100$\mu$ (passing a 150 mesh per linear inch screen), the marginal sizes between two adjacent fractions being omitted, whereby there is a substantial jump in grain size between the smallest particles in the next coarser fraction and the largest particles in the next finer fraction; molding the mixture into bricks and baking the bricks.

3. A process as in claim 2, in which the jump in grain size between the smallest particles in the next coarser fraction and the largest particles in the next finer fraction amounts to 400 to 1000$\mu$ corresponding to the difference between a 35 and 16 mesh per linear inch screen.

4. In the process of making chromite-magnesia brick having unprecedented spalling resistance, great strength at high temperatures and at least fair strength at atmospheric temperatures, the improvement which comprises adjusting the proportion of the sizes of particles in a material consisting essentially of ground chromite and ground magnesia, in such a manner that the mixture will contain 20 to 40 parts of a fine fraction substantially composed of magnesia particles of a size below about 100$\mu$ (passing through a 150 mesh per linear inch screen) and of about 60 to 80 parts of a coarse fraction substantially composed of chromite particles of a size above about 1000$\mu$ (retained on a 16 mesh per linear inch screen); molding the mixture into bricks and baking the bricks.

5. Refractory chromite-magnesia brick composed essentially of a mixture of particles of chromite and magnesia in which the weight of said chromite is not less than 60%, and in which the proportion of fine material initially smaller than 100$\mu$ (passing through a 150 mesh per linear inch screen) is at least about 20 to 40 parts, the proportion of intermediate material of initial particle sizes between 100$\mu$ and 1000$\mu$ (between a 150 and 16 mesh per linear inch screen) is not over 15 to 25 parts and the proportion of coarse material of initial particle size above 1000$\mu$ (retained on a 16 mesh per linear inch screen), is at least about 35 to 65 parts, more than one half of the magnesia being in a fine state of initial particle size below about 100$\mu$, said brick being characterized by having a spalling resistance of not below 30.

6. Brick as defined in claim 5, in which the said intermediate fraction is wholly omitted.

7. Refractory chromite-magnesia brick composed essentially of a mixture of particles of chromite and magnesia in which the weight of said chromite substantially exceeds the weight of the magnesia, and in which the proportion of fine material initially smaller than 100$\mu$ (passing through a 150 mesh per linear inch screen) is at least about 20 to 40 parts, the proportion of intermediate material of initial particle sizes between 100$\mu$ and 1000$\mu$ (between a 150 and 16 mesh per linear inch screen) is not over 15 to 25 parts and the proportion of coarse material of initial particle size above 1000$\mu$ (retained on a 16 mesh per linear inch screen), is at least about 35 to 65 parts, substantially all of the magnesia being in a fine condition of initial particle size below about 100$\mu$, whereas the said fine fraction below about 100$\mu$ contains substantially no chromite, said brick being characterized by having a spalling resistance of not below 30.

8. Refractory chromite-magnesia brick, composed essentially of 20 to 40 parts of a fine fraction substantially consisting of magnesia particles of an initial particle size below about 100$\mu$ (passing through a 150 mesh per linear inch screen), and of about 60 to 80 parts of a coarse fraction substantially composed of chromite particles of an initial particle size above about 1000$\mu$ (retained on a 16 mesh per linear inch screen).

9. In the manufacture of refractory molded products suitable for use without previous kiln firing, composed principally of chromite and burned magnesite, the chromite predominating over the magnesite, which process comprises preparing a mixture consisting essentially of 20 to 40 parts of fine material which will pass a 150 mesh screen, and 80 to 60 parts of coarse material which will be held on a 16 mesh screen, 20 to 40% of the entire mixture being burned magnesite which exists chiefly as finer grain fraction, adding a binding substance to said mixture, and molding such mixture under a pressure of at least 2843 lbs. per sq. in., drying the molded products.

10. A dry molded chrome-magnesia refractory having very high resistance to spalling, such product consisting essentially of 20 to 40 parts of fine material which will pass a 150 mesh screen, and 80 to 60 parts of coarse material which will be retained on a 16 mesh screen, 20 to 40% of the entire mixture being burned magnesite which exists chiefly as finer grain fraction, and the remainder being essentially chromite, which product is suitable for use in the unfired condition.

11. In the process of making chromite-magnesia brick having unprecedented spalling resistance, great slag resistance and strength at high temperatures, and fair strength at atmospheric temperatures, the improvement which comprises adjusting the proportion of the sizes of particles in a material consisting essentially of ground chromite and ground magnesia, in which the amount of said chromite is between 60 and 80%, in such a manner that the mixture will contain at least about 20 to 40 parts of a fine fraction composed of particles of a size below $100\mu$ (passing through a 150 mesh per linear inch screen), and at least about 35 to 65 parts of a coarse material composed of particles of a size above about $1000\mu$ (retained on a 16 mesh per linear inch screen), over one-half of the said magnesia being in a fine condition below about $100\mu$ (passing through a 150 mesh per linear inch screen); and such material being entirely free from any intermediate fraction composed of particles of a size between about $100\mu$ and about $1000\mu$ (between a 150 and a 16 mesh per linear inch screen); molding the mixture into bricks and baking the bricks.

KONRAD ERDMANN.